United States Patent Office 2,754,192
Patented July 10, 1956

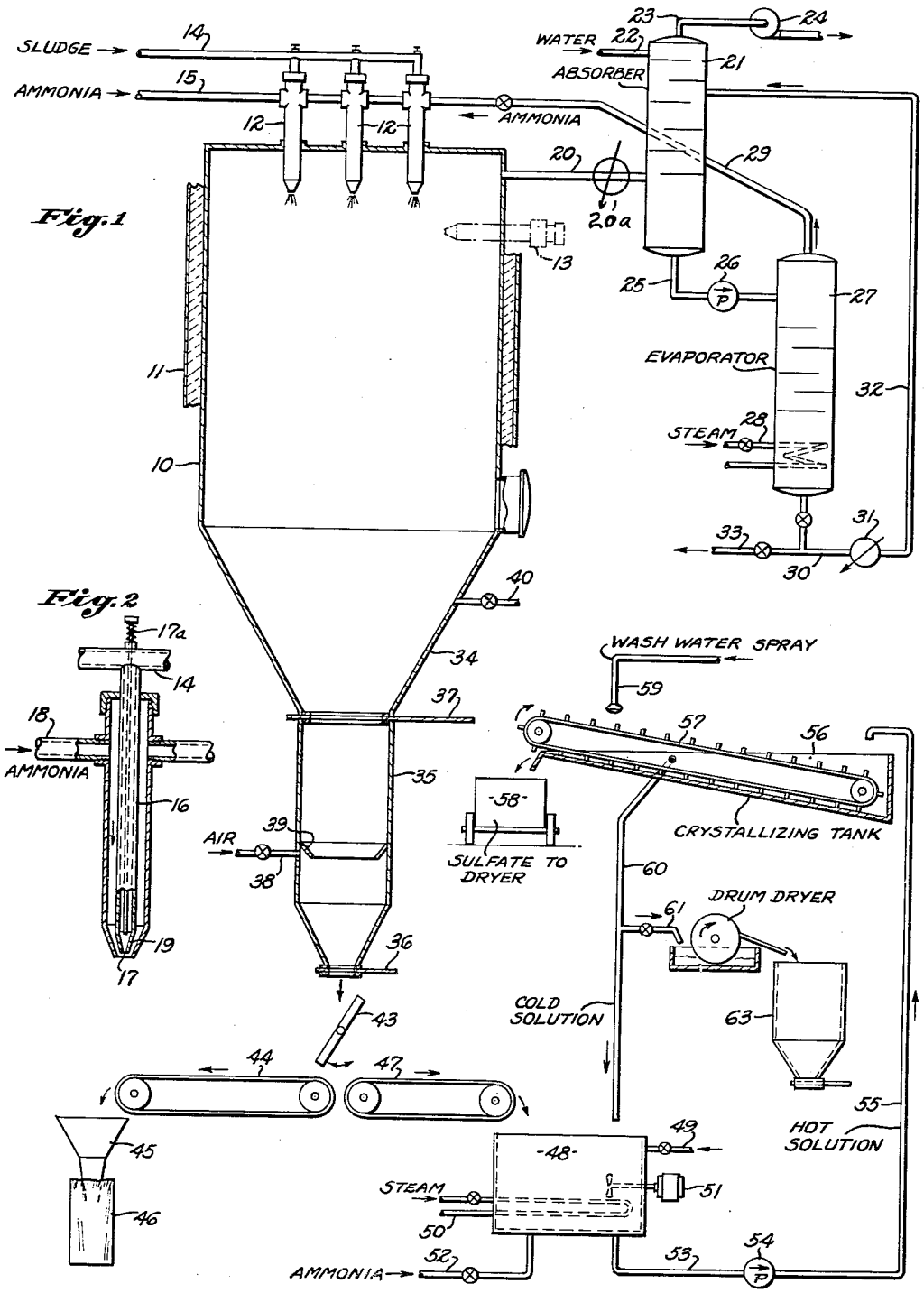

2,754,192

CONVERSION OF ACID SLUDGES

Ulric B. Bray, Pasadena, and Vanderveer Voorhees, Los Altos, Calif., assignors to Bray Oil Company, Los Angeles, Calif., a limited partnership of California Application May 21, 1953, Serial No. 356,398

3 Claims. (Cl. 71—54)

This invention relates to the treatment, conversion and neutralization of sulfuric acid sludges, and more particularly to the treatment of sludges obtained from the sulfonation of petroleum oils with concentrated or fuming sulfuric acid. Still more particularly, the invention relates to the neutralization of sulfuric acid sludges with ammonia and their conversion to ammonium sulfate, sulfite, sulfonate and similar products suitable for use as nitrogenous fertilizers.

The invention is illustrated by a drawing which shows diagrammatically in Figure 1 an apparatus for carrying out the process. Figure 2 shows a detail of a spray nozzle employed in the process.

It has heretofore been the practice in refining lubricating oils, fuel oils and other petroleum products to contact the oil with strong sulfuric acid, the process being called "acid-treating." Acid, having a concentration of 93% to 98%, is frequently employed for this purpose. In the manufacture of white oils, such as medicinal oils, it is necessary to use fuming sulfuric acids and a large portion of the oil is converted to sludge, e. g., up to 50% of its volume. Customarily, from about one half to five pounds of acid per gallon of oil is employed, depending on the extent of refinement of the oil which is required.

In the manufacture of sulfonic acids and more particularly in the preparation of the preferentially oil soluble sulfonic acids, aromatic oils are treated with fuming acid to effect sulfonation of the oil, the temperature usually being held below about 125 to 140° F. to avoid decomposition of the desired sulfonic acids held in solution in the oil. For this purpose, lubricating fractions having a viscosity of about 100 to 500 sec. Saybolt at 100° F. from selected aromatic type oils are preferred. After contacting the oil and acid intimately, the product is allowed to separate either by gravity or by centrifuging and two or three layers are obtained, depending on the reaction conditions. A small amount of water, e. g., 1 to 5%, can be added to aid separation of sludge and oil. Larger amounts of water tend to cause separation of a solid or semi-solid phase difficult to handle and impossible to pump through small diameter pipes. The upper oil layer is removed, leaving an acid sludge layer which may separate into a thin bottom layer, predominantly sulfuric acid, and a less fluid upper layer of oil insoluble sulfonic acids, sometimes called green acids or brown acids. It is sometimes the practice to add to the sulfonation products a light solvent, such as petroleum naphtha or toluene or xylene to facilitate separation of sludge from oil. The solvent remains largely in the oil layer and is later recovered and used again. However, a small amount of solvent, about 1–2% in case of xylene, remains in the sludge and assists in keeping it fluid.

The concentration of sulfuric acid in the sludge ordinarily varies from about 70 to 90%. The dilution comprises water resulting from the sulfonation reaction and organic matter mainly sulfonated aromatic hydrocarbons, sulfated olefins, nitrogen bases, etc. Heretofore, the treatment and disposal of sulfuric acid sludges of this character has been a major problem in the petroleum industry. Recovery of the acid by reconcentration has involved serious problems with corrosion, atmospheric pollution, etc. Dumping in streams and in pits is generally prohibited by law because of pollution of water supplies. Where geographical location permits the sludges are sometimes disposed of by dumping into the ocean at considerable handling cost and loss of potentially valuable acid.

One object of this invention is to recover the valuable constituents of sulfuric acid sludge in an economical manner. Another object of the invention is to produce a valuable nitrogenous fertilizer from sulfuric acid sludge. Still another object of the invention is to provide an apparatus for disposing of sulfuric acid sludge which will not be subjected to the corrosive action of dilute acid. A still further object of the invention is to provide for alternative production of pure ammonium sulfate from sulfuric acid sludge without the necessity of providing expensive acid purification and evaporation.

Referring to the drawing, neutralizing chamber or tower 10, preferably insulated as shown in broken section at 11, is provided with atomizing nozzles 12 in the upper part thereof. It is preferred that the nozzles be directed downward from the top of the tower 10, but another suitable arrangement employs horizontal nozzles directed toward the center of the tower from the side near the top, as indicated by dotted lines at 13. The tower should be of sufficient diameter and the nozzles suitably placed to prevent the spray from the nozzles impinging on the walls of the tower or on the nozzles themselves.

Nozzles of the atomizing type are employed, the construction being such that a stream of sludge is injected into a turbulent zone supplied with ammonia gas. Referring to the drawing, sludge from line 14 is led to the nozzles 12, where it is conducted through a central channel to the tip of each nozzle, where it is mixed externally of the nozzle with a high velocity stream of ammonia gas, or liquid, introduced through line 15. Referring to the detail of the nozzle shown in Figure 2, sludge is forced under pressure through the central channel 16 and is ejected in a stream through the orifice at the tip 17. Sliding pin 17a extends through the channel 16 to the tip of the nozzle to clean the tip if it becomes clogged. Ammonia, introduced under pressure at 18, flows through the annular opening 19, surrounding the sludge outlet 17, and the high velocity of the ammonia effects atomization of the sludge and its instant neutralization.

In order to effect complete neutralization of the sludge, it is atomized to a high degree of subdivision as represented by particles of the order of about 10 to 100 microns diameter. For this purpose, we prefer to employ ammonia under pressure of about 100 to 500 p. s. i. The pressure on the sludge may be of the order of 5 to 100 p. s. i., generally about 10 to 50 p. s. i., depending on the rate of flow desired, and the nozzle characteristics. In order to increase the amount of ammonia at the outlet of the nozzle, auxiliary orifices not shown may be provided. We may also employ a nozzle provided with separate passages for air and ammonia, the air jets being directed against the acid sludge stream to effect initial dispersion before contacting the ammonia jets from the separate passages. The sludge jet from orifice 17 can be more rapidly dispersed by imparting to it a whirling motion in the conventional manner, spiral grooves or vanes being provided immediately inside the orifice 17. Likewise the ammonia stream issuing at the annular orifice may have a rotary motion imparted by suitable vanes inside the orifice.

When the ammonia is supplied to the nozzle as a liquid, the pressure will usually be upwards of about 200 p. s. i. and the liquid ammonia is instantly vaporized in contact with the acid spray. The cooling effect of the evaporating ammonia serves to reduce the temperature of the highly exothermic reaction. Conversely, when heat is desired in the reaction chamber, as when starting up the operation or when evaporating other solutions therein, the ammonia can be supplied to the nozzles 12 as a preheated gas, superheated to any desired temperature, e. g. 100 to 500° F. by suitable heater on conduit 15, not shown.

In the operation of the ammonia neutralizing nozzles, it is desirable to employ a considerable excess of ammonia beyond that required for neutralizing the acid, preferably from 5 to 50 per cent excess ammonia being suitably employed in our process. The excess unneutralized ammonia gas accumulates in the chamber 10, where it assists in completing the neutralization of the acid. The excess ammonia, together with water vapor resulting from the high temperature developed at the point of neutralization, is conducted from the tower by line 20, leading to cooler 20a and absorber 21, where ammonia is recovered from air and non-condensable gases by water introduced by line 22, and unabsorbed gases, air, etc., are withdrawn by line 23, leading to exhaust fan 24, then vented to the atmosphere. Fan 24 applies a slight subatmospheric pressure to the reaction chamber 10, thereby preventing loss of ammonia through leakage to the atmosphere. It also assists in removing ammonia from the product of the reaction as will be hereinafter described.

Ammonia solution condensed in 20a collects in scrubber 21 and is withdrawn by line 25 and forced by pump 26 to stripper 27, where the ammonia is boiled out of the solution by steam coil 28, and conducted by line 29, back to the mixing nozzles 12, or directly to chamber 10 by line not shown, if desired. The water from boiler 27 passes by line 30 to cooler 31 and thence to absorber 21, where is it employed for absorption of further quantities of ammonia. Any ammonium sulfate dust carried over from chamber 10 to absorber 21 is dissolved in the water therein and the resulting solution is withdrawn from the absorber-reboiler system by line 33 and the solution may be evaporated to recover ammonium sulfate therefrom by conventional methods. However, we prefer to prevent loss of sulfate dust from 10 by operating at a low vapor velocity therein or by use of a cyclone at the inlet of line 20. We can also recover sulfate dust as a concentrated solution by partial condensation of the vapor in line 20 in advance of cooler 20a. By condensing about 5–20% of the steam present, substantially all the sulfate dust is recovered and the resulting solution may be sprayed into the tower 10 and evaported therein by the heat of the neutralizing reaction.

The product of neutralizing sludge with ammonia in tower 10, which is a fine yellow or light brown powder, falls to the bottom of the chamber 10, accumulating as a mass in the conical section 34. From time to time, or continuously, the hot, dry, granular, freely-flowing powder, is drawn through the discharge leg 35 controlled by outlet valve 36. Valve 36 may be a simple shutter or sliding vane or a mechanical valve, such as a star valve, may be employed. If it is desired to withdraw the product intermittently, a cut-off valve 37, suitably a shutter or sliding vane, may be provided at the top of the discharge leg 35. In order to avoid loss of ammonia by entrapment in the powdered product, a small amount of air may be admitted at 38 below baffle 39, which serves to distribute the air into the product. Additional air may be admitted to the reaction chamber 10 at one or more points as indicated at 40, to assist in carrying away water vapor, hydrocarbons, and other volatiles evaporated from the sludge.

In starting up the apparatus, it is desirable to initially heat the reaction chamber, for example, by introducing a torch therein, to a temperature above the point of condensing water, e. g.: about 200° F. Unless this is done, water vapor condensing on the walls of the chamber forms liquid water which contaminates the product and interferes with its free-flowing characteristics. After the operation is started, the heat of neutralization of sludge is sufficient to keep the chamber 10 above the point of condensing water.

The granular product from the reaction chamber 10 is suitable for use as fertilizer without further processing. It may be directed by deflector 43 to belt conveyor 44 and charged to hopper 45, from which it is immediately bagged as indicated at 46, any suitable bagging machine being employed for this purpose. As indicated hereinabove, the product is a fine, free-flowing powder, which is comprised largely of ammonium sulfate with ammonium salts of organic acids, traces of hydrocarbons and other organic materials derived from the sludge. Tests made on the product as a fertilizer, show that it is superior to commercial ammonium sulfate as a growth promoter, and it possesses rapid wetting action resulting from the presence of ammonium sulfonates. Sulfonates present also have a valuable soil conditioning action, loosening the soil and making it more friable.

For the manufacture of pure ammonium sulfate, the product may be diverted by vane 43 onto belt conveyor 47, discharging into dissolving tank 48, which is supplied with water by line 49 and heated by steam coil 50 or by direct steam to a temperature of about 180–220° F. Agitating means 51 are provided to effect rapid solution of the product in the dissolving tank. Additional ammonia may be introduced by line 52 to ensure neutrality of the solution. The hot saturated solution prepared in tank 48 is withdrawn by line 53 and pump 54, thence flowing by line 55 to crystallizing tank 56. Alternatively, the hot solution may be allowed to crystallize on trays in the conventional manner. Crystals of ammonium sulfate separated out on cooling, are mechanically removed from tank 56 by conveyor 57 or by other suitable device. The ammonium sulfate product passes upward from the tank and is dropped into suitable receivers, for example, in shallow bed cars 58, which may be passed through a drying tunnel or other device for final drying of the product. A spray of wash water from line 59 may be directed onto the product as indicated. The cold mother liquor can be recycled by line 60 to dissolving tank 48 for use in dissolving additional raw product. The hot saturated solution in line 53 may be settled or filtered to eliminate insoluble matter and produce a purer ammonium sulfate product.

From time to time or continuously, a portion or all of the mother liquor from the recrystallizing system is withdrawn by line 61 to evaporator 62, which may be of the conventional drum type, in which the liquor is evaporated on the surface of a steam heated drum and the product removed therefrom by a scraper leading it into a suitable receiver 63. This product, consisting largely of ammonium salts of organic acids, can be employed as a fertilizer alone or in admixture with products made at 46. In general, it is desirable when making ammonium sulfate, to limit the amount of dissolved organic material in the mother liquor to about 10 to 25% of the weight of the solution. When the concentration of organic matter substantially exceeds 25%, recovery of pure ammonium sulfate at 58 is hampered. Instead of controlling the build-up of organic matter in the mother liquor by drum evaporation, as indicated at 62, we may operate our process on an intermittent basis, storing the excessively contaminated mother liquor during periods when pure ammonium sulfate is being manufactured and evaporating it in chamber 10 by spraying thereinto during periods when fertilizer is being manufactured at 46. Operating in this manner, the excessive heat of neutralization in 10 is used to dehydrate the accumulated mother liquor. Additional heat for this purpose may be supplied to tower 10 by introducing hot combustion gases thereinto by means not shown.

The exhaust fan 24 is suitably operated to maintain a sub-atmospheric pressure on the reactor of the order of one-half inch to one inch of water, thereby preventing all loss of ammonia gas. The high solubility of ammonia in the water employed in absorber 21 effectively prevents loss of ammonia from the system and assures nearly 100% ammonia recovery efficiency.

As an example of our process, sludge from the treatment of mineral lubricating oil with fuming sulfuric acid titrating about 80% $H_2SO_4$ was charged at 12 p. s. i. pressure to a spray nozzle where it was atomized with ammonia gas at 165 p. s. i. The acid mist immediately became a dry powder of ammonium sulfate, sulfonate, sulfite, etc., which was collected in the bottom of the chamber enclosing the nozzle. Analysis of the product by titration showed that 84 per cent of the acid in the sludge was completely neutralized to diammonium sulfate and the remainder to the acid sulfate, sulfonates, etc.

In operating our process, the sludge may be initially separated into two layers and only the lower layer having the higher acid concentration charged to the neutralizer. This is particularly advantageous when making pure ammonium sulfate at 58. When making fertilizer sulfate, we prefer to charge the process with a mixture of the total sludge from an agitated supply tank, or we may allow separation of the sludge to occur and charge the upper layer to one or more nozzles in chamber 10 while simultaneously charging sludge from the lower layer to other nozzles, thus producing a product which is a mixture of both sludges.

Analysis of the upper layer of sludge resulting from fuming acid treatment of a furfural extracted lubricating oil with separation of sludge after addition of 2% water and 50% petroleum xylene fraction gave an acidity of 42.5% by titration, calculated as $H_2SO_4$. The upper layer is considerably more viscous than the lower layer but flows easily and can be atomized in the ammonia nozzle without difficulty. Very heavy sludges from lubricating oil treating with concentrated or fuming acid, can be thinned with solvents such as benzene or toluene, carbon tetrachloride, etc., to facilitate atomization and the solvent then recovered from the ammonia absorber 21.

Where a number of sludges are available from the treatment of different oils, we may spray two or more streams thereof independently into a single chamber to produce a uniform blend of ammonium salts. We may also spray ammonium nitrate, phosphoric acid and/or potassium salt solutions into the neutralizing chamber in limited amounts up to the capacity of the chamber to evaporate the water therefrom, thus producing a fertilizer containing valuable phosphate and potash salts.

The product of our process may suitably be blended with other fertilizers or further processed to facilitate handling in agricultural machinery. It may be pelleted alone or in combination with other fertilizers and the organic constituents present serve the useful purpose of a binder in the pelleting operation. The product can also be formed into a cake by application of high pressure and the cake then ground to give a granulated product. The high temperature of the neutralization reaction occurring substantially in the vapor phase, results in the hydrolysis and amination of sulfuric and sulfonic acid esters, lactones, and other derivatives of these acids which are normally neutral and non-reactive with ammonia. Accordingly, the product of our process is unusually free from these neutral compounds of sulfonic and sulfuric acids which have the objectionable property of hydrolysing in storage.

Having thus described our invention, what we claim is:

1. The process of neutralizing sulfuric acid sludge containing dissolved organic matter, which comprises injecting a stream of sludge into a high velocity jet of ammonia gas, then expanding said jet of ammonia gas and sludge in a neutralizing zone to effect atomization and neutralization of said sludge by said ammonia with formation of ammonium sulfate and ammonium salts of organic acids in finely divided form, and simultaneously evaporating water and volatile organic matter by the heat of the neutralization reaction.

2. The process of claim 1 wherein steam and dust removed from said neutralizing zone are condensed and the liquid condensate is returned to said neutralizing zone in the form of a spray to be evaporated therein.

3. The process of neutralizing heavy sulfuric acid sludges difficult to handle which comprises diluting said sludge with a solvent, injecting it into a jet of ammonia at high velocity, then expanding said jet of ammonia and sludge, thereby atomizing and simultaneously neutralizing the said sludge and vaporizing said solvent by the heat of the reaction, and separately condensing the solvent vapors for reuse in the process.

References Cited in the file of this patent

UNITED STATES PATENTS

| | | |
|---|---|---|
| 1,098,562 | Ekstrom | June 2, 1914 |
| 1,923,212 | Jost et al. | Aug. 22, 1933 |
| 1,983,320 | Sperr | Dec. 4, 1934 |
| 2,026,250 | Pyzel et al. | Dec. 31, 1935 |
| 2,331,235 | Ruys et al. | Oct. 5, 1943 |
| 2,524,341 | Chapman et al. | Oct. 3, 1950 |
| 2,656,248 | Simms | Oct. 20, 1953 |